US012643610B2

(12) United States Patent
Woo et al.

(10) Patent No.: US 12,643,610 B2
(45) Date of Patent: Jun. 2, 2026

(54) VEHICULAR FASTENING APPARATUS

(71) Applicant: HYUNDAI MOBIS CO., LTD., Seoul (KR)

(72) Inventors: Hyun Jin Woo, Yongin-si (KR); Jong Mook Park, Yongin-si (KR); Ho Youn Hwang, Yongin-si (KR); Hye Chan Park, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 427 days.

(21) Appl. No.: 18/235,070

(22) Filed: Aug. 17, 2023

(65) Prior Publication Data

US 2024/0059354 A1 Feb. 22, 2024

(30) Foreign Application Priority Data

Aug. 18, 2022 (KR) ........................ 10-2022-0103320

(51) Int. Cl.
*F16B 5/02* (2006.01)
*B62D 24/02* (2006.01)
(52) U.S. Cl.
CPC ................ *B62D 24/02* (2013.01); *F16B 5/02* (2013.01)
(58) Field of Classification Search
CPC ...... B62D 27/06; B62D 27/065; B62D 27/00; B62D 25/2009; B62D 65/02; B62D 65/024; B62D 21/02; B62D 24/02; F16B 7/042; F16B 7/1409; F16B 5/02; B60K 1/04
See application file for complete search history.

(56) References Cited

U.S. PATENT DOCUMENTS

| | | | | |
|---|---|---|---|---|
| 2,984,144 A * | 5/1961 | Erdmann | ................ | F16B 39/36 411/434 |
| 4,921,203 A * | 5/1990 | Peterson | ................ | B62D 27/04 267/141.1 |
| 4,930,961 A * | 6/1990 | Weis | .................... | F16B 37/0864 411/266 |
| 6,439,816 B1 * | 8/2002 | Nance | .................... | F16B 37/145 411/432 |
| 7,036,875 B2 * | 5/2006 | Kanie | .................. | B62D 29/048 296/29 |
| 11,199,217 B2 * | 12/2021 | Zhou | .................... | F16B 37/0864 |
| 11,767,066 B2 * | 9/2023 | Woo | ...................... | B62D 65/024 296/35.1 |
| 2011/0268531 A1 * | 11/2011 | Heide | ...................... | F16B 31/06 411/432 |
| 2019/0316621 A1 * | 10/2019 | Hill | ........................ | F16B 13/128 |
| 2021/0179203 A1 * | 6/2021 | Olsson | .............. | B62D 33/0604 |
| 2022/0389951 A1 * | 12/2022 | Block | ........................ | F16B 5/02 |
| 2023/0055806 A1 * | 2/2023 | Woo | ........................ | B62D 27/00 |
| 2023/0056169 A1 * | 2/2023 | Woo | ........................ | B60K 1/04 |

(Continued)

FOREIGN PATENT DOCUMENTS

KR 10-2021-0077367 A 6/2021

*Primary Examiner* — Daniel J Wiley
(74) *Attorney, Agent, or Firm* — Morgan, Lewis & Bockius LLP

(57) ABSTRACT a vehicular fastening apparatus includes a first fastening member fixed to a first structure; a housing fixed to a second structure and having a first opening into which the first fastening member is inserted; and a second fastening member positioned inside the housing, fastened to the first fastening member inserted into the housing through the first opening, and movable in a direction that intersects an insertion direction of the first fastening member.

15 Claims, 10 Drawing Sheets

(56) References Cited

U.S. PATENT DOCUMENTS

| | | | |
|---|---|---|---|
| 2023/0056302 A1* | 2/2023 | Woo | B62D 27/06 |
| 2023/0242187 A1* | 8/2023 | Woo | B62D 24/00 |
| 2023/0278633 A1* | 9/2023 | Woo | B62D 24/00 |
| | | | 296/204 |

* cited by examiner

FIG. 2

VEHICULAR FASTENING APPARATUS

CROSS-REFERENCE TO RELATED APPLICATION

This application claims the benefit under 35 U.S.C. § 119(a) of priority to Korean Patent Application No. 10-2022-0103320, filed on Aug. 18, 2022 in the Korean Intellectual Property Office, the entire disclosure of which is incorporated herein by reference for all purposes.

BACKGROUND

Field

Exemplary embodiments of the present disclosure relate to a vehicular fastening apparatus and, more particularly, to a vehicular fastening apparatus capable of easily mounting or separating a top hat or a battery module to or from a chassis frame of a purpose built vehicle (PBV).

Discussion of the Background

Typically, a PBV refers to a future-oriented vehicle that is designed and constructed to freely utilize the in-vehicle space for a particular purpose or application. With developments in autonomous traveling technology, the PBV provides tailored services to meet users' needs while traveling to a destination.

The PBV employs a structure to couple a top hat, which refers to the upper vehicle body designed to meet users' needs, to a chassis frame in a skateboard-shaped chassis frame, with a battery module being widely positioned in the lower portion of the chassis frame. Accordingly, there is a need for development of a novel fastening structure where the top hat or the battery module can be easily separated, for replacement, from the vehicle chassis frame and where assembly automation can be implemented.

The related art of the present disclosure is disclosed in Korean Patent Application Publication No. 10-2021-0077367 (published on Jun. 25, 2021 and entitled "VEHICLE BODY ASSEMBLY STRUCTURE").

SUMMARY

Various embodiments, which are made to solve the above-mentioned problem, are directed to a vehicular fastening apparatus capable of easily mounting or separating a top hat or a battery module to or from a chassis frame of a PBV.

A vehicular fastening apparatus according to the present disclosure may include: a first fastening member fixed to a first structure; a housing fixed to a second structure and having a first opening into which the first fastening member is inserted; and a second fastening member positioned inside the housing, fastened to the first fastening member inserted into the housing through the first opening, and movable in a direction that intersects an insertion direction of the first fastening member.

The first fastening member may include a body, a male screw thread being formed in an outer circumferential surface of the body, and the second fastening member may include a hollow column, the body being inserted into an inside hole in the hollow column, and a female screw thread, which is engaged with the male screw thread, being formed in an inner circumferential surface of the hollow column.

The first fastening member may further include a conical portion continuous with an end of the body, an outer diameter of the conical portion decreasing toward the direction away from the body.

The second fastening member may include a funnel continuous with an end of the hollow column facing the first fastening member, an inner diameter of the funnel increasing toward the direction away from the hollow column.

An outer circumferential surface of the hollow column may have a polygonal cross section.

The housing may have the second opening formed to be opposite in direction to the first opening, and a tool for rotating the second fastening member may be capable of entering the housing through the second opening.

The second opening may have a greater inner diameter than the first opening.

The vehicular fastening apparatus may include a second opening closing-off washer positioned inside the housing and closing off the second opening.

The second opening closing-off washer may include: a ring-shaped portion movable in the lengthwise direction of the hollow column, the hollow column passing through the ring-shaped portion; and a flange expanding outward from the ring-shaped portion.

The vehicular fastening apparatus may further include a spring elastically pressing against the second opening closing-off washer in a direction in which the second opening is closed off.

The vehicular fastening apparatus may further include a spring support washer positioned inside the housing, supporting the spring, and supported on the flange.

When the second fastening member rotates, the second opening closing-off washer may rotate together with the second fastening member, and the spring support washer may not rotate together with the second opening closing-off washer.

The housing may include one or more guide rails on the inner surface thereof, and the spring support washer may include one or more guide grooves in the outer surface thereof, the one or more guide rails being inserted into the one or more guide grooves, respectively.

The ring-shaped portion may be formed in such a manner that an inner surface thereof has a cross section of which a shape corresponds to a shape of a cross section of the outer circumferential surface of the hollow column that is inserted in the ring-shaped portion.

The flange may have an outer diameter greater than an inner diameter of the second opening.

The vehicular fastening apparatus according to the present disclosure is one assembly into which components necessary to fasten the first structure and the second structure to each other are assembled. Thus, a machine and manpower for feeding the fastening member are not required when the vehicular fastening apparatus is used for assembling. The use of the vehicular fastening apparatus can prevent the fastening member from being lost, and can facilitate the automation of an assembling operation. As a result, the use of the vehicular fastening apparatus can provide the advantage of reducing manufacturing costs and assembling productivity.

With the vehicular fastening apparatus according to the present disclosure, it is possible that the first structure and the second structure are coupled to each other. This is because the first fastening member and the second fastening member can be fastened to each other as long as the first fastening member can be inserted into the first opening in the housing. In other words, a slight distortion occurring in the first structure or the second structure may result in a relatively high tolerance between the position of the first fastening member and the position of the housing. Even in such cases, the first fastening member and the second fastening member can still be repeatedly fastened to and separated from each other. Furthermore, there is no need for any additional operations of compensating for the distortion in the first structure or the second structure.

BRIEF DESCRIPTION OF THE DRAWINGS

FIG. 2 is a perspective view illustrating the vehicular fastening apparatus according to the embodiment of the present disclosure.

DETAILED DESCRIPTION OF THE ILLUSTRATED EMBODIMENTS

A vehicular fastening apparatus according to an embodiment of the present disclosure will be described below with reference to the accompanying drawings. The terminology used in the present disclosure is for describing a desired embodiment of the present disclosure and may vary according to the intention of a user or operator, the practices in the art to which the present disclosure pertains, and the like. Therefore, the terminology should be contextually defined in light of the present specification.

Figure 1:
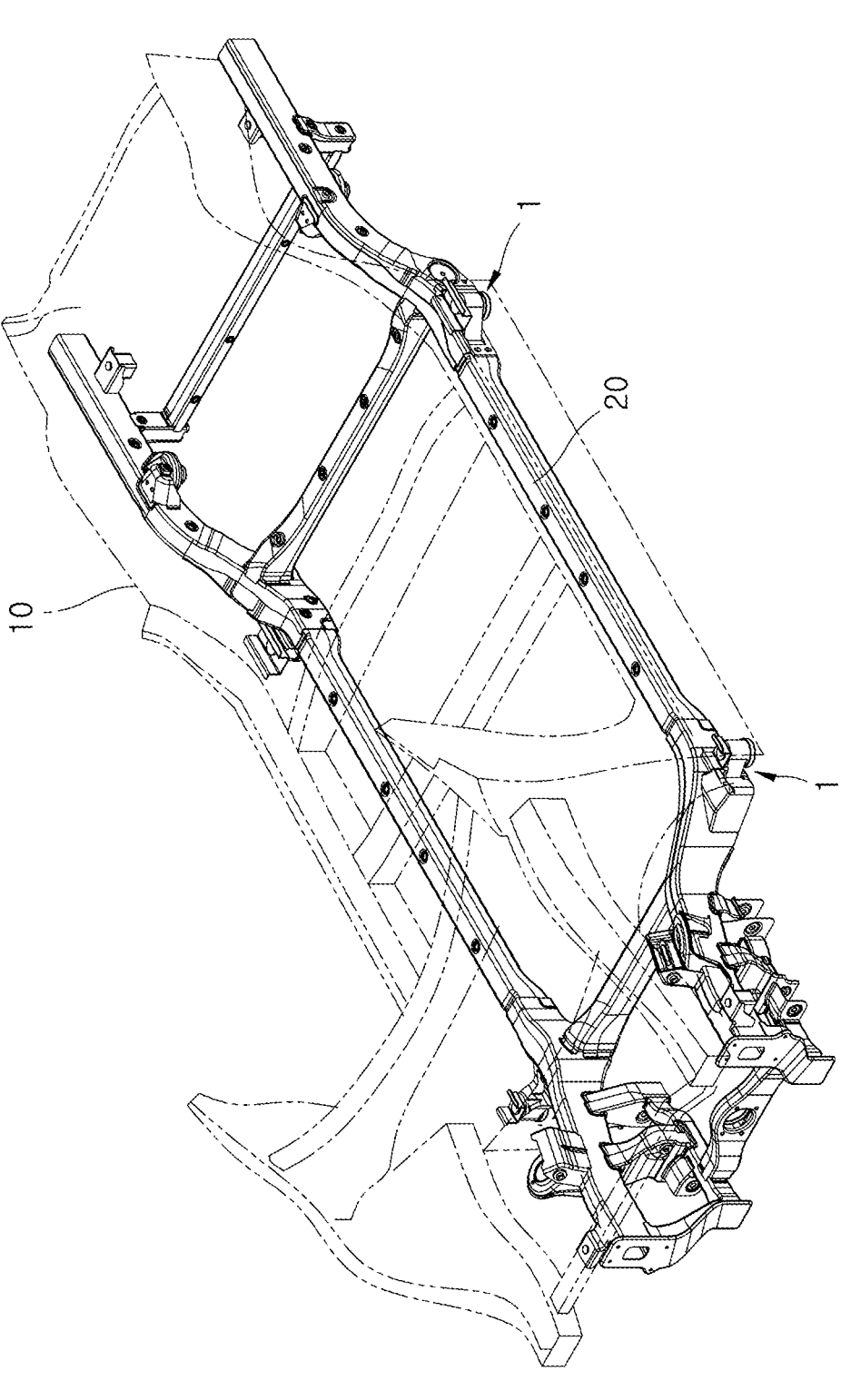
FIG. 1 is a perspective view schematically illustrating a state where a vehicular fastening apparatus according to an embodiment of the present disclosure is installed.
Figure 2:
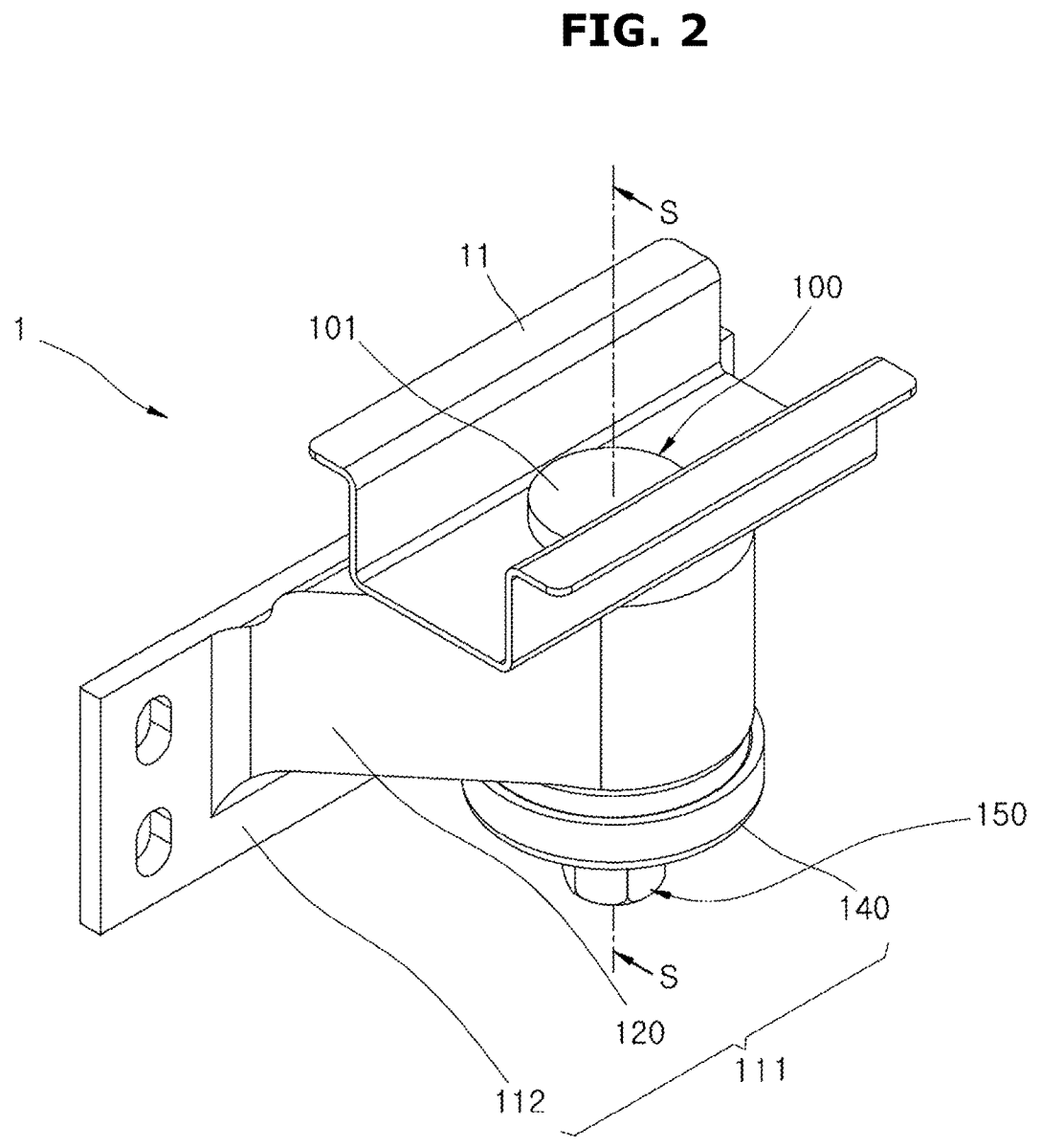
Figure 3:
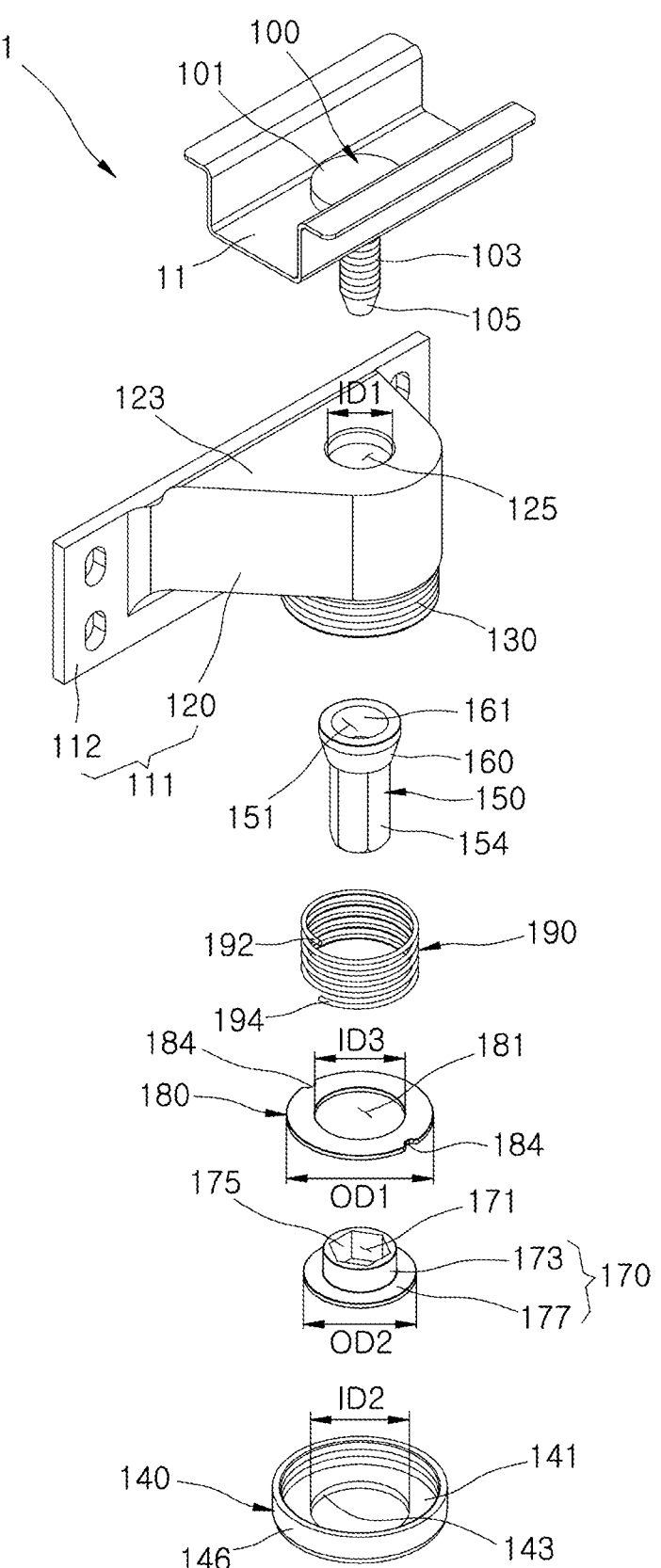
FIG. 3 is an exploded perspective view illustrating the vehicular fastening apparatus according to the embodiment of the present disclosure.
Figure 4:
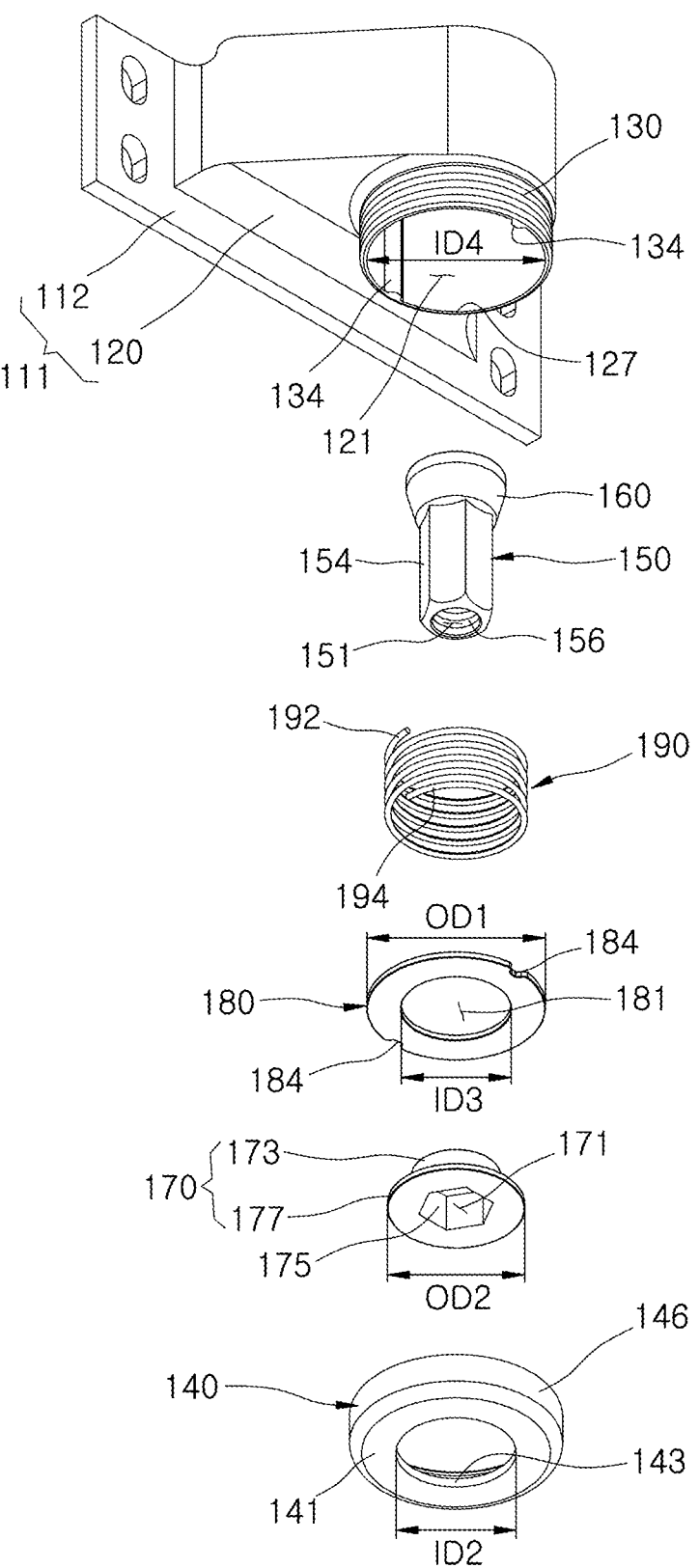
FIG. 4 is an exploded perspective view illustrating the vehicular fastening apparatus, when viewed from below.

FIG. 1 is a perspective view schematically illustrating a state where a vehicular fastening apparatus 1 according to an embodiment of the present disclosure is installed. FIG. 2 is a perspective view illustrating the vehicular fastening apparatus 1 according to the embodiment of the present disclosure. FIG. 3 is an exploded perspective view illustrating the vehicular fastening apparatus 1 according to the embodiment of the present disclosure. FIG. 4 is an exploded perspective view illustrating the vehicular fastening apparatus 1, when viewed from below.

With reference to FIGS. 1 to 4, the vehicular fastening apparatus 1 according to the embodiment of the present disclosure includes a first fastening member 100, a housing 111, a second fastening member 150, a second opening closing-off washer 170, a spring support washer 180, and a spring 190.

A first structure 10 and a second structure 20, described below, may be exemplified by a top hat and a chassis frame, respectively, that are customizable or replaceable according to the purpose of a user in using a vehicle. The top hat corresponds to a vehicle body. The chassis frame is installed in the lower portion of the vehicle and structurally supports the vehicle. However, the first structure 10 and the second structure 20 are not limited to the top hat and the chassis frame, respectively. They may be variously design-changed as different structures, such as a chassis frame and a battery module, that are capable of being separably fastened to each other in the upward-downward direction in the vehicle.

The first fastening member 100 is fixed to the first structure and is fastened to the second fastening member 150, thereby fixing the first structure 10 and the second structure 20 to each other. The first fastening member 100 according to the embodiment of the present disclosure may be a bolt-shaped member including a head 101, a body 103, and a conical portion 105.

The head 101 is a circular plate-shaped portion of the first fastening member 100. The head 101 is fixed to a first-structure fixation bracket 11 through welding or bonding. The first-structure fixation bracket 11 is fixedly coupled to a lower end portion of the first structure. The body 103 is a cylindrical portion of the first fastening member 100. The cylindrical portion has a smaller outer diameter than the head 101. A male screw thread is formed in an outer circumferential surface of the body 103. An upper end of the body 103 is connected to the head 101. The body 103 extends downward from the head 101 in a manner that passes through the first-structure fixation bracket 11. The conical portion 105 extends from an end, that is, a lower portion, of the body 103 facing the second fastening member 150. The conical portion 105 is tapered in such a manner that an outer diameter thereof decreases toward the direction away from the body 103, that is, toward the downward direction.

The housing 111 includes a mounting bracket 112, a pocket 120, and a cap 140. The mounting bracket 112 is fixedly coupled to the second structure 20. The pocket 120 is integrally formed with the mounting bracket 112. The cap 140 is detachably coupled to a lower end of the pocket 120. An internal space 121 approximately in the shape of a cylinder is formed in the pocket 120. The second fastening member 150, the second opening closing-off washer 170, the spring support washer 180, and the spring 190 are accommodated within the internal space 121. A lower opening 127 is formed in a lower end portion of the pocket 120. The lower opening 127 is open in such a manner as to allow the second fastening member 150, the second opening closing-off washer 170, the spring support washer 180, and the spring 190 to be accommodated within the internal space 121.

The cap 140 is detachably coupled to the pocket 120. The second fastening member 150, the second opening closing-off washer 170, the spring support washer 180, and the spring 190 that are accommodated within the internal space 121 are prevented by the cap 140 from escaping out of the pocket 120 through the lower opening 127.

In other words, a cap coupling portion 130 in the shape of a ring is provided on a lower end of the pocket 120. The cap coupling portion 130 restricts the lower opening 127 and protrudes downward. A male screw thread is formed in an outer surface of the cap coupling portion 130. The cap 140 includes a circular plate-shaped portion 141 that is flat, and a ring-shaped wall 146 that protrudes upward from an outer circumferential surface of the circular plate-shaped portion 141. A female screw thread that is engaged with the male screw thread of the cap coupling portion 130 is formed in an inner circumferential surface of the ring-shaped wall 146.

With this structure, the cap 140 is brought into contact with the cap coupling portion 130 in such a manner that the cap coupling portion 130 and the ring-shaped wall 146 are aligned with each other in the upward-downward direction. When the cap 140 is rotated in one direction into the pocket 120, the male screw thread and the female screw thread are engaged with each other, thereby coupling the cap 140 to the pocket 120. Conversely, when the cap 140 is rotated in the opposite direction out of the pocket 120, the male screw thread and the female screw thread are disengaged from each other, thereby separating the cap 140 from the pocket 120.

A first opening 125 and a second opening 143 are formed in the top and bottom, respectively, of the housing 111. The first opening 125 is open to allow the conical portion 105 and the body 103 of the first fastening member 100 to be inserted in the housing 111. The second opening 143 is open to allow a tool 5 (refer to FIG. 5) for rotating the second fastening member 150 to enter the internal space 121 in the pocket 120.

Specifically, the first opening 125 is formed in such a manner as to pass through an upper wall 123 of the pocket 120, and the second opening 143 is formed in such a manner as to pass through the circular plate-shaped portion 141 of the cap 140. The second opening 143 has an inner diameter ID2 greater than an inner diameter ID1 of the first opening 125.

The second fastening member 150 is positioned in the internal space 121 in the pocket 120 and is fastened to the first fastening member 100 that is inserted into the pocket 120 through the first opening 125. The second fastening member 150 in the shape of a nut has an inside hole 151 through the middle. The body 103 and the conical portion 105 of the first fastening member 100 are inserted in the inside hole 151 in the second fastening member 150. The second fastening member 150 includes a hollow column 154 and a funnel 160. The inside hole 151, which has a uniform diameter along the upward-downward direction, that is, the lengthwise direction of the hollow column 154, is formed in the hollow column 154. A female screw thread that is engaged with the male screw thread in the outer circumferential surface of the body 103 is formed in an inner circumferential surface 156 that restricts the inside hole 151 in the hollow column 154.

An outer circumferential surface of the hollow column 154 may have a horizontal cross-section in the shape of a polygon, for example, a regular hexagon, in such a manner that the second fastening member 150 is rotated into the first fastening member 100 using the tool 5 (refer to FIG. 5), such as a socket wrench. However, the regular hexagonal shape of the outer circumferential surface of the hollow column 154, which is illustrated in FIGS. 3 and 4, is exemplary. The outer circumferential surface of the hollow column 154 may be a different type of regular polygon, such as a regular triangle, a square, or a regular octagon, or may be a polygon other than a regular polygon.

The funnel 160 is formed on an end, that is, an upper end of the hollow column 150 facing the first fastening member 100 that is inserted into the pocket 120 through the first opening 125. The inside hole 151 in the funnel 160 is continuous with the inside hole 151 in the hollow column 154. An inner circumferential surface 161 of the funnel 160 restricts the inside hole 151 in the funnel 160. An inner diameter of the funnel 160 increases toward the direction away from the hollow column 150, that, toward the upward direction. An outer diameter of the funnel 160 also increases toward the upward direction. A lower end of an outer surface of the funnel 160 and an upper end of an outer surface of the hollow column 150 are not continuous with each other at the boundary point.

The second opening closing-off washer 170 is positioned in the internal space 121 in the pocket 120. When the tool 5 (refer to FIG. 5) does not enter the pocket 120 through the second opening 143, the second opening closing-off washer 170 closes off the second opening 143 in such a manner that foreign material is not introduced into the pocket 120 through the second opening 143. The second opening closing-off washer 170 includes a ring-shaped portion 173 and a flange 177.

An inside hole 171 through which the hollow column 154 passes is formed in the ring-shaped portion 173. The ring-shaped portion 173 is movable in the lengthwise direction of the hollow column 154 in a state where the hollow column 154 passes through the ring-shaped portion 173. In other words, the hollow column 154 is inserted into the ring-shaped portion 173. An inner surface 175 of the ring-shaped portion 173 restricts the inside hole 171 of the ring-shaped portion 173. The ring-shaped portion 173 has the inner polygonal surface 175 that corresponds to an outer polygonal surface of the hollow column 154. As illustrated in FIGS. 3 and 4, the hollow column 154 has an outer regular hexagonal surface, and the ring-shaped portion 173 has an inner regular hexagonal surface that restricts the inside hole 171 in the inner surface 175. As a result, the second opening closing-off washer 170, when ascending and descending along the hollow column 154, does not rotate about the second fastening member 150.

The flange 177 is formed to expand in such a manner that an outer diameter thereof increases at a lower end of the ring-shaped portion 173. The flange 177 has an outer diameter OD2 greater than the inner diameter ID2 of the second opening 143 in such a manner that the second opening closing-off washer 170 does not escape out of the pocket 120 through the second opening 143, thereby not being separated therefrom.

The spring 190 is positioned in the internal space 121 in the pocket 120 and elastically presses against the second opening closing-off washer 170 in a direction in which the second opening 143 is closed off. The spring support washer 180 is a member in the shape of a ring. An inside hole 181 through which the ring-shaped portion 173 passes is formed in the spring support washer 180 in a manner that passes through the middle thereof. The spring support washer 180 is positioned in the internal space 121 in the pocket 120. The spring support washer 180 supports a lower end portion 194 of the spring 190 and is supported on the flange 177 by being brought into surface contact therewith. An upper end portion 192 of the spring 190 is supported on the upper wall 123 of the pocket 120. The upper end portion 192 and the lower end portion 194 of the spring 190 are chamfered in such a manner as to be supported on the upper wall 123 and the spring support washer 180 by being brought into surface contact therewith.

The spring support washer 180 has an outer diameter OD1 smaller than an inner diameter ID4 of the lower opening 127 in the pocket 120 in such a manner as to be inserted into the internal space 121 in the pocket 120. The spring support washer 180 has an inner diameter ID3 smaller than the outer diameter OD2 of the flange 177. When the spring support washer 180 has the inner diameter ID3 equal to or greater than the outer diameter OD2 of the flange 177, the spring support washer 180 may be supported on the circular plate-shaped portion 141 of the cap 140 by being brought into surface contact therewith, instead of being supported on the flange 177.

The pocket 120 includes one or more guide rails 134 that protrude, in a vertically extending manner, from an inner surface of the pocket 120 that restricts the internal space 121 in the pocket 120. One or more guide grooves 184 that are inserted into the one or more guide rails 134, respectively, are formed in an outer circumferential surface of the spring support washer 180. As a result, when the second fastening member 150 is rotated by the tool 5, the second opening closing-off washer 170 rotates together with the second fastening member 150, but the spring support washer 180 does not rotate together with the second fastening member 150 and the second opening closing-off washer 170.

Figure 5:
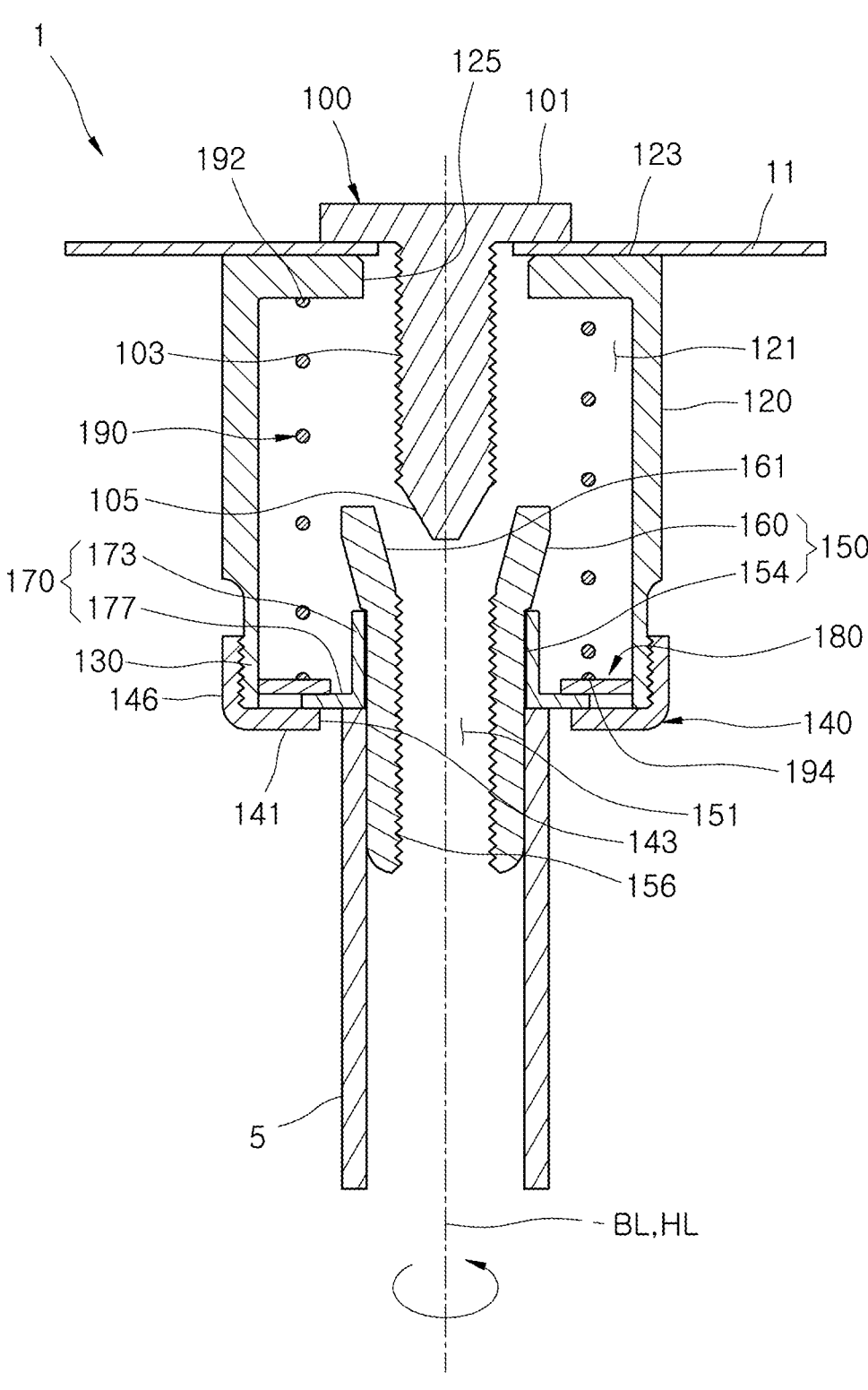
FIGS. 5 to 7 are cross-sectional views taken along line S-S on the vehicular fastening apparatus in FIG. 2, and sequentially illustrating steps of fastening a first fastening member and a second fastening member that are inserted, without eccentricity, into a housing of the vehicular fastening apparatus according to the embodiment of the present disclosure.
Figure 6:
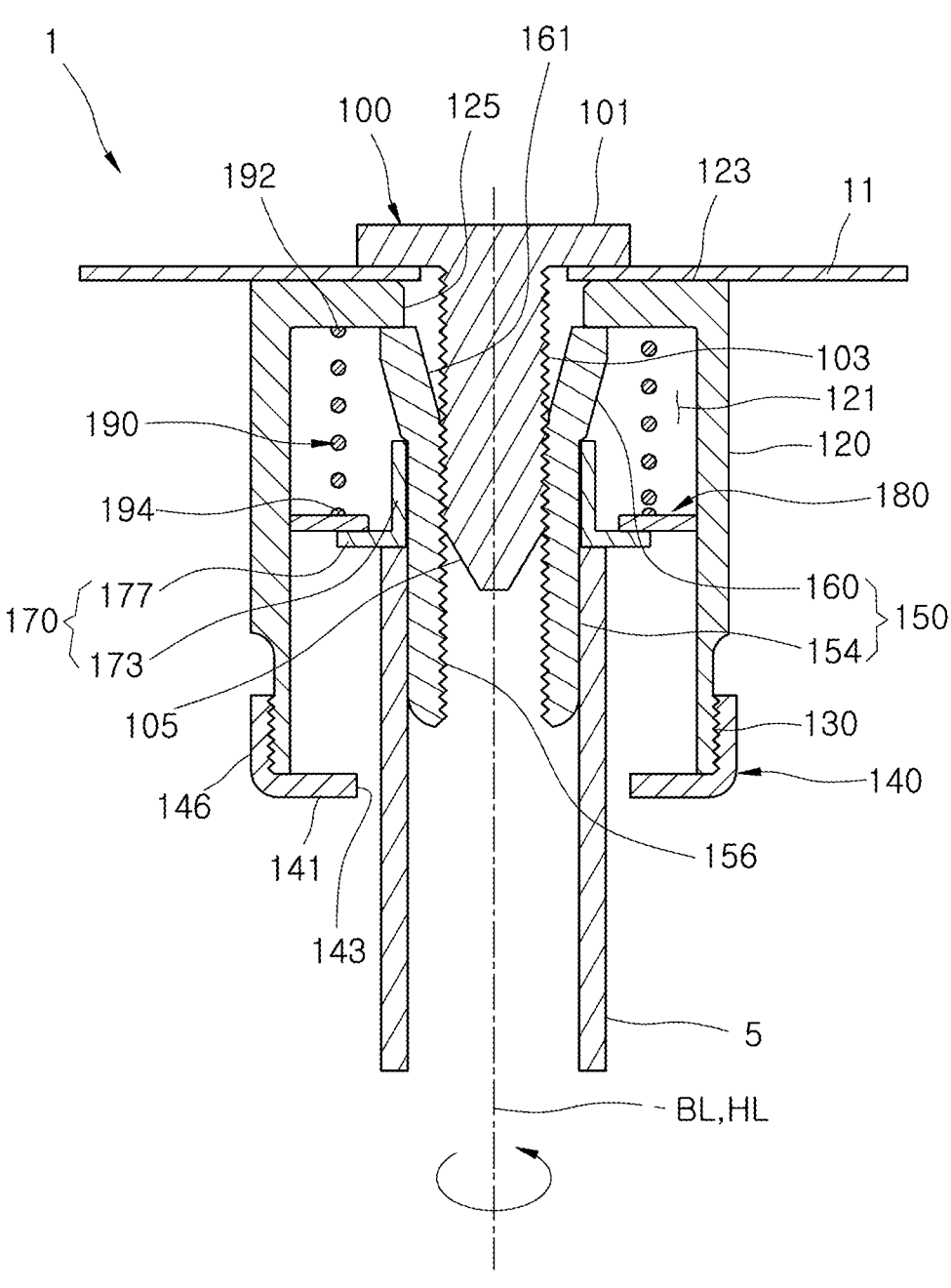
Figure 7:
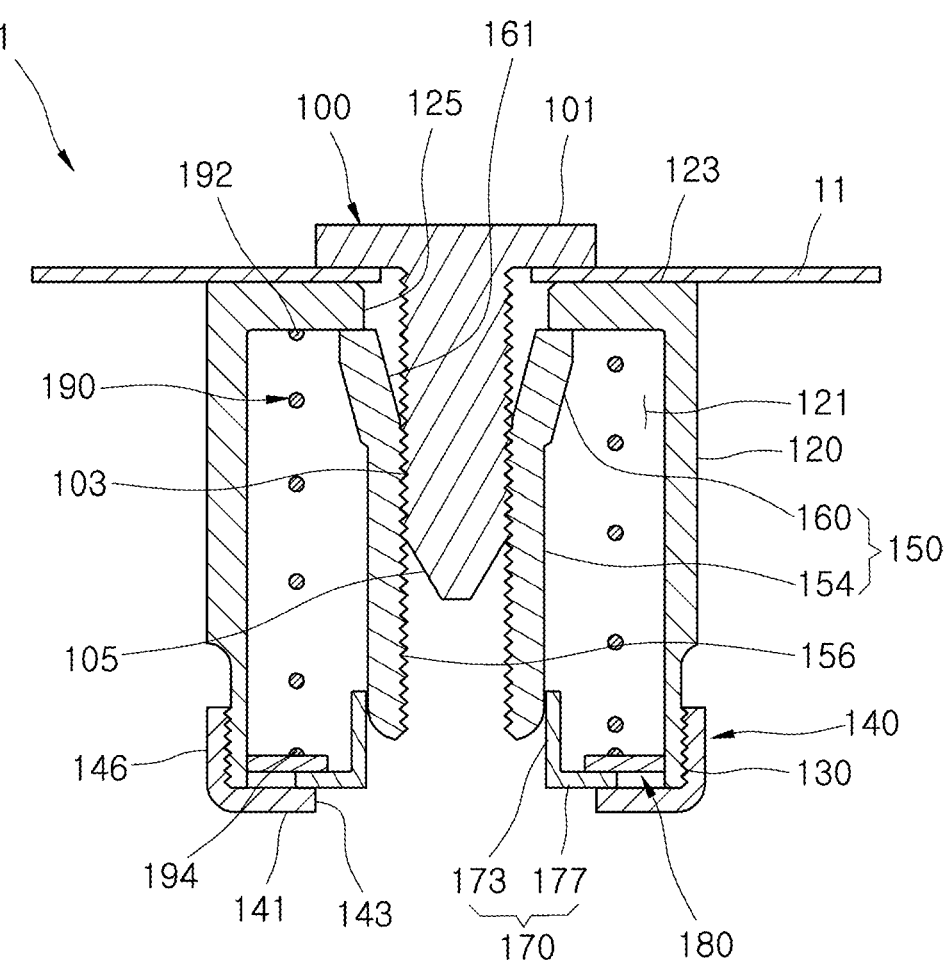

A process of fastening the first structure 10 and the second structure 20 to each other using the vehicular fastening apparatus 1 will be described below. FIGS. 5 to 7 are cross-sectional views taken along line S-S on the vehicular fastening apparatus 1 in FIG. 2, and sequentially illustrating steps of fastening the first fastening member and the second fastening member that are inserted, without eccentricity, into the housing 111 of the vehicular fastening apparatus 1 according to the embodiment of the present disclosure. With reference to FIGS. 3 and 5, the first structure 10 (refer to FIG. 1) is positioned on top of the second structure 20 (refer to FIG. 1), with the assistance of manpower or robots. Then, the first fastening member 100, which is fixed to the first structure 10 (refer to FIG. 1) using the first-structure fixation bracket 11 and extends downward in the vertical direction, is inserted into the internal space 121 in the pocket 120 through the first opening 125 in the housing 111 fixedly coupled to the second structure 20. At this point, the first fastening member 100 may be inserted, without eccentricity, into the first opening 125. In other words, the conical portion 105 and the body 103 of the first fastening member 100 may be inserted into the internal space 121 through the first opening 125 in such a manner that an axial line BL of the body 103, which extends in the lengthwise direction of the body 103, aligns with an axial line HL of the housing 111. The axial line HL connects the center of the first opening 125 and the center of the second opening 143 to each other.

Next, an operator brings an end of the tool 5 into contact with the flange 177 of the second opening closing-off washer 170 in such a manner that a low end portion of the hollow column 154 protruding from under the pocket 120 through the second opening 143 is inserted into a low end portion of the tool 5. Then, the operator proceeds to push the tool 5 upward. As a result, an upper end portion of the ring-shaped portion 173 of the second opening closing-off washer 170 ascends, pushing the funnel 160 and the hollow column 154 upward. Consequently, the conical portion 105 passes through the inside hole 151 in the funnel 160 and then enters the inside hole 151 in the hollow column 154.

Next, the operator rotates the tool 5 about the axial line BL of the body 103 in one direction in such a manner that the female screw thread in the hollow column 154 and the male screw thread in the body 103 are engaged with each other. As a result, as illustrated in FIG. 6, the second fastening member 150 rotates about the axial line BL of the body 103 in one direction, ascending until an upper end of the funnel 160 comes into close contact with the upper wall 123 of the pocket 120. Consequently, the surface area where the male screw thread in the body 103 and the female screw thread in the hollow column 154 are engaged with each other increases. This increase in surface area significantly enhances the fastening force between the first fastening member 100 and the second fastening member 150.

In this state, the first-structure fixation bracket 11 and the upper wall 123 of the housing 111 are firmly brought into close contact with each other, thereby stably coupling the first structure 10 and the second structure 20 to each other. In addition, the second opening closing-off washer 170 and the spring support washer 180 ascend, thereby elastically compressing the spring 190.

Next, when the operator pulls the tool 5 out of the pocket 120 through the second opening 143, the spring support washer 180 and the second opening closing-off washer 170, as illustrated in FIG. 7, descend with an elastic restorative force of the spring 190. Consequently, the flange 177 closes off the second opening 143. In other words, a gap between a lower end of the hollow column 154 and an inner circumferential edge of the second opening 143 is closed off by the second opening closing-off washer 170. Additionally, the inside hole 151 in the hollow column 154 is closed off by the body 103 and the conical portion 105, and the first opening 125 is closed off by the head 101 and the first-structure fixation bracket 11. As a result, even when the vehicle travels during long periods of time, foreign material is prevented from being introduced into the internal space 121 in the pocket 120. As a result, the internal space 121 in the pocket 120 remains free from contamination by the foreign material.

In a case where the coupled first structure 10 and second structure 20 need to be separated from each other, the operator brings the end of the tool 5 into contact with the flange 177 of the second opening closing-off washer 170 and pushes the tool 5 upward in such a manner that a lower end portion of the hollow column 154 is inserted into the lower end portion of the tool 5. Then, when the operator rotates the tool 5 about the axial line BL of the body 103 in the other direction, that is, in the direction opposite to the direction in which the first fastening member 100 and the second fastening member 150 are fastened to each other, the second fastening member 150 descends with respect to the first fastening member 100. As a result, the male screw thread in the first fastening member 100 and the female screw thread in the second fastening member 150 become disengaged from each other. This disengagement separates the first structure 10 and the second structure 20 from each other.

Figure 8:
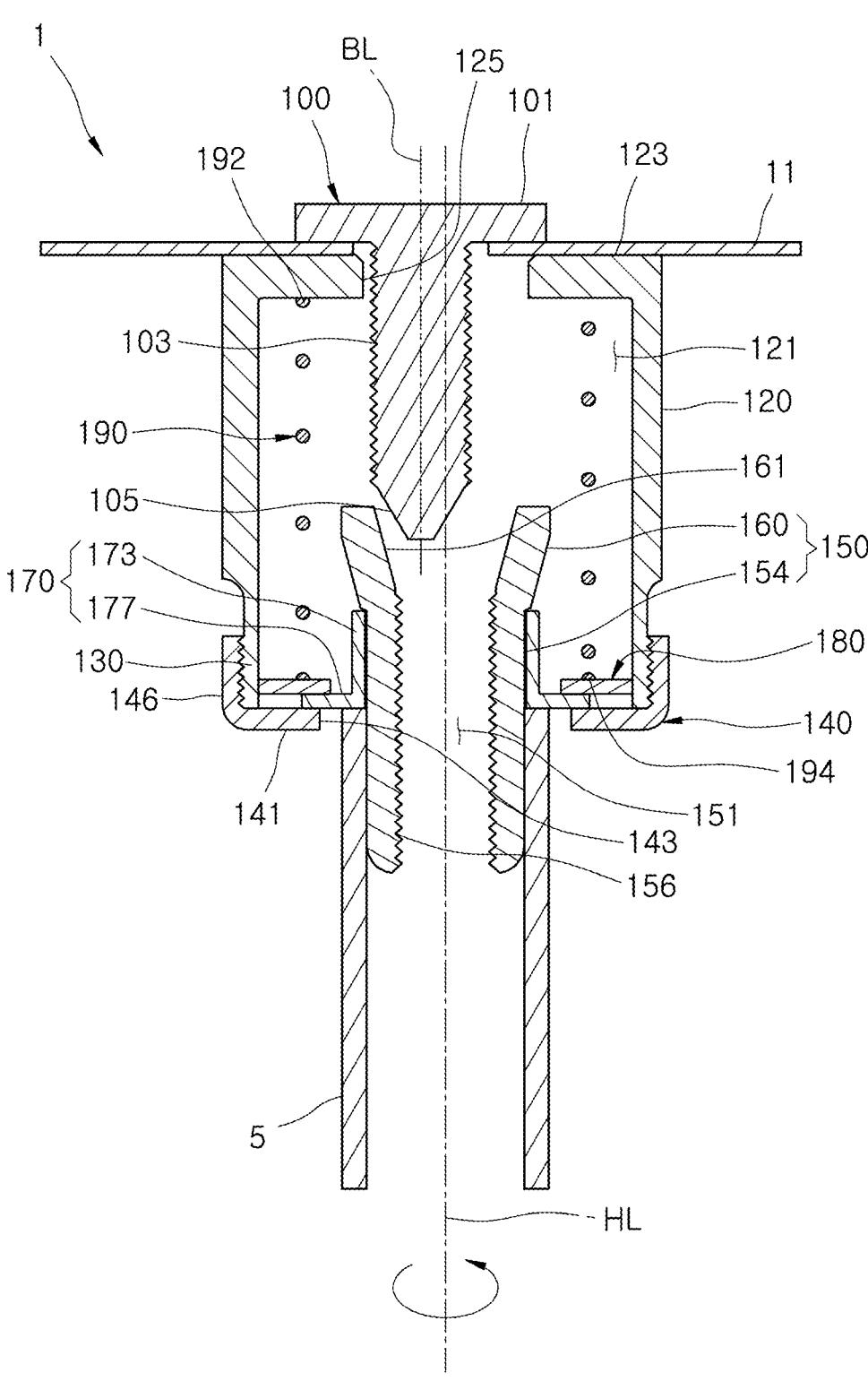
FIGS. 8 to 10 are cross-sectional views taken along line S-S on the vehicular fastening apparatus in FIG. 2, and sequentially illustrate steps of fastening the first fastening member and the second fastening member that are inserted, with eccentricity, into the housing of the vehicular fastening apparatus according to the embodiment of the present disclosure.
Figure 9:
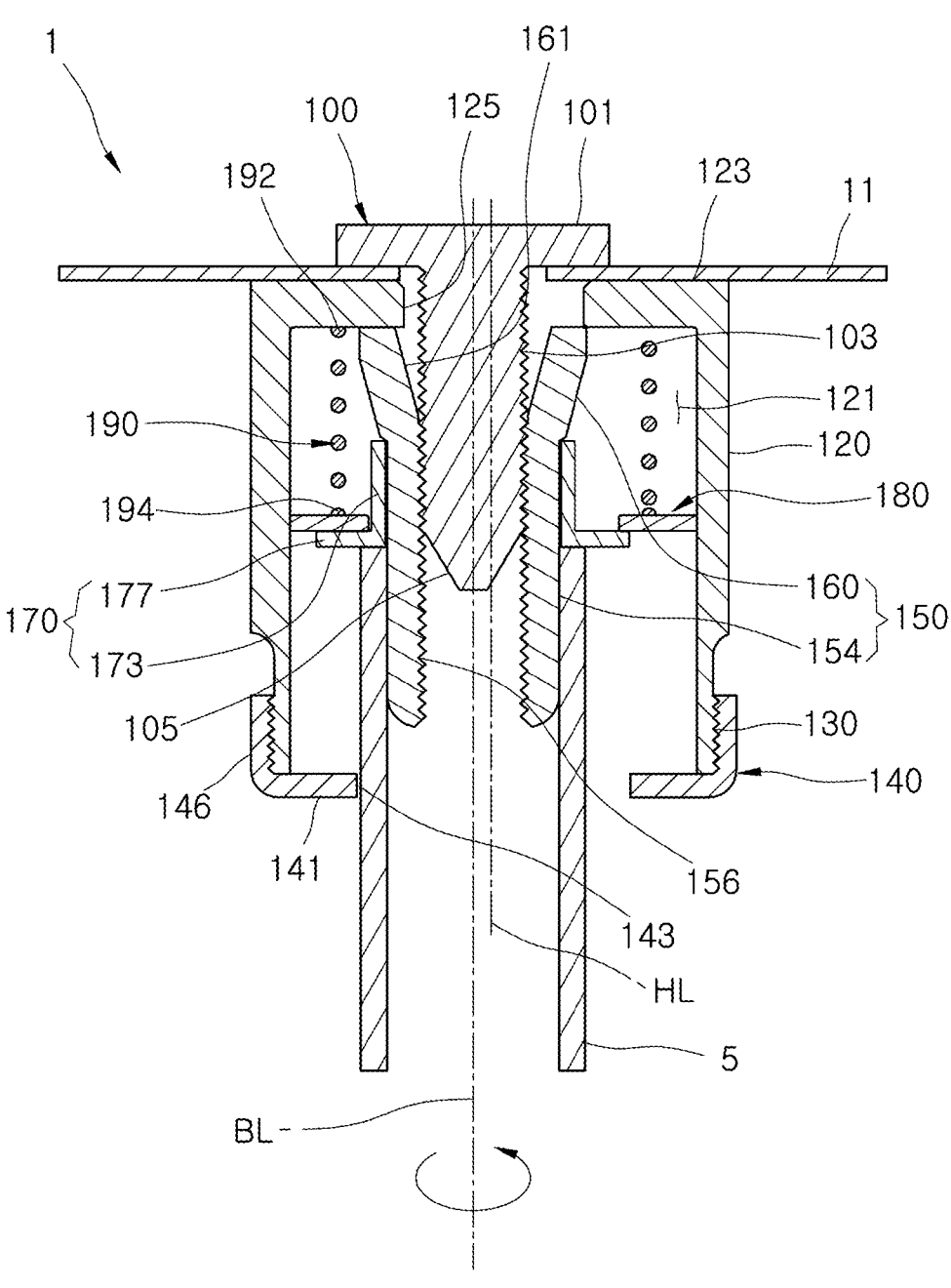
Figure 10:
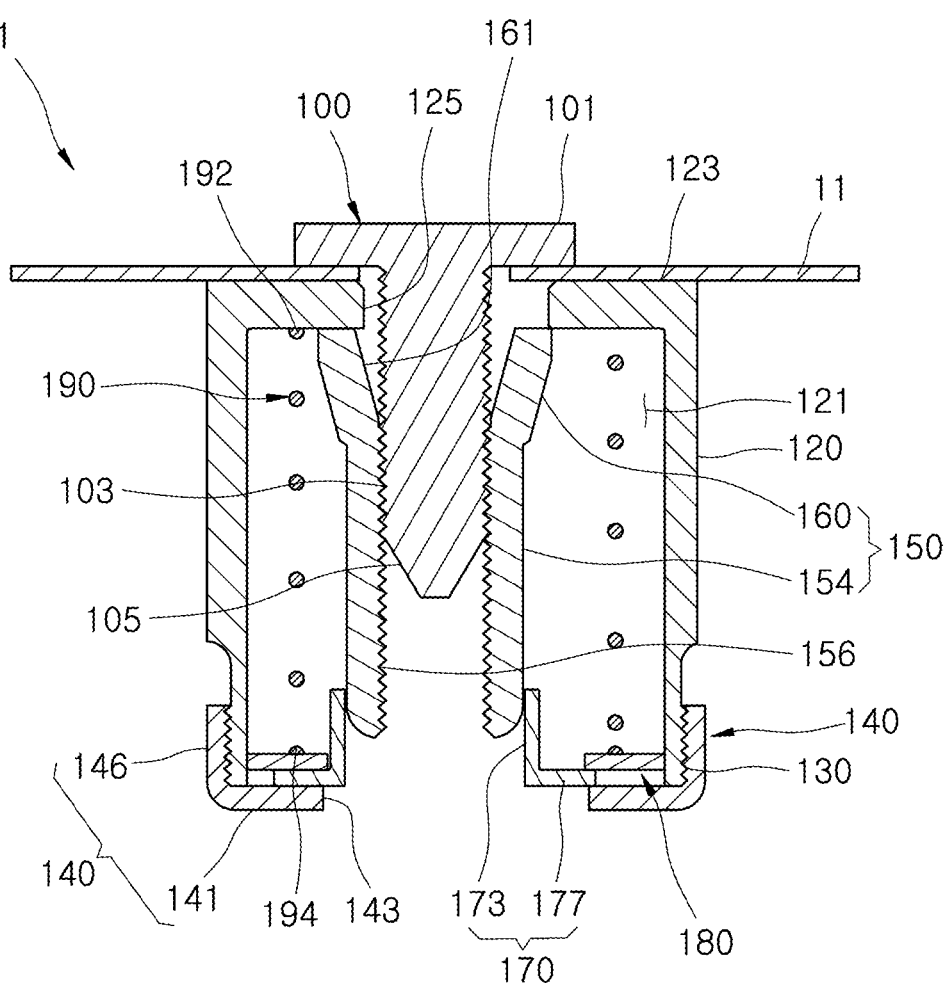

FIGS. 8 to 10 are cross-sectional views taken along line S-S on the vehicular fastening apparatus in FIG. 2, and sequentially illustrate steps of fastening the first fastening member and the second fastening member that are inserted, with eccentricity, into the housing of the vehicular fastening apparatus according to the embodiment of the present disclosure. With reference to FIGS. 3 and 8, the first structure 10 (refer to FIG. 1) is positioned on top of the second structure 20 (refer to FIG. 1), with the assistance of manpower or robots. Then, the first fastening member 100, which is fixed to the first structure 10 (refer to FIG. 1) using the first-structure fixation bracket 11 and extends downward in the vertical direction, is inserted into the internal space 121 in the pocket 120 through the first opening 125 in the housing 111 fixedly coupled to the second structure 20. At this point, the first fastening member 100 may be inserted, with eccentricity, into the first opening 125. In other words, the conical portion 105 and the body 103 of the first fastening member 100 may be inserted into the internal space 121 through the first opening 125 in such a manner that the axial line BL of the body 103, which extends in the lengthwise direction of the body 103, does not align with the axial line HL of the housing 111. The axial line HL connects the center of the first opening 125 and the center of the second opening 143 to each other.

Next, the operator brings the end of the tool 5 into contact with the flange 177 of the second opening closing-off washer 170 in such a manner that the low end portion of the hollow column 154 protruding from under the pocket 120 through the second opening 143 is inserted into the low end portion of the tool 5. Then, the operator proceeds to push the tool 5 upward. As a result, the upper end portion of the ring-shaped portion 173 of the second opening closing-off washer 170 ascends, pushing the funnel 160 and the hollow column 154 upward. Consequently, the conical portion 105 comes into contact with the inner circumferential surface 161 of the funnel 160.

When the operator further pushes the tool 5 upward, the conical portion 105 and the inner circumferential surface 161 of the funnel 160 interfere with each other. This interference causes the second fastening member 150 to move in the intersection direction of the axial line BL of the body 103. In other words, the interference causes the second fastening member 150 to move in the direction that intersects the insertion direction of the first fastening member 100. This movement aligns the hollow column 154 of the second fastening member 150 with the axial line BL. As a result, the conical portion 105 enters the inside hole 151 in the hollow column 154. The vehicular fastening apparatus 1, which is illustrated in FIGS. 8 to 10, according to the embodiment of the present disclosure includes the conical portion 105 in the first fastening member 100 and the funnel 160 in the second fastening member 150. However, the present disclosure is not limited to this configuration. The vehicular fastening apparatus 1 may include one of the conical portion 105 and the funnel 160.

Next, the operator rotates the tool 5 about the axial line BL of the body 103 in one direction in such a manner that the female screw thread in the hollow column 154 and the male screw thread in the body 103 are engaged with each other. As a result, as illustrated in FIG. 9, the second fastening member 150 rotates about the axial line BL of the body 103 in one direction, ascending until the upper end of the funnel 160 comes into close contact with the upper wall 123 of the pocket 120. Consequently, the surface area where the male screw thread in the body 103 and the female screw thread in the hollow column 154 are engaged with each other increases. This increase in surface area significantly enhances the fastening force between the first fastening member 100 and the second fastening member 150.

In this state, the first-structure fixation bracket 11 and the upper wall 123 of the housing 111 are firmly brought into close contact with each other, thereby stably coupling the first structure 10 and the second structure 20 to each other. In addition, the second opening closing-off washer 170 and the spring support washer 180 ascend, thereby elastically compressing the spring 190.

Next, when the operator pulls the tool 5 out of the pocket 120 through the second opening 143, the spring support washer 180 and the second opening closing-off washer 170, as illustrated in FIG. 10, descend with an elastic restorative force of the spring 190. Consequently, the flange 177 closes off the second opening 143. In other words, the gap between the lower end of the hollow column 154 and the inner circumferential edge of the second opening 143 is closed off by the second opening closing-off washer 170. Additionally, the inside hole 151 in the hollow column 154 is closed off by the body 103 and the conical portion 105, and the first opening 125 is closed off by the head 101 and the first-structure fixation bracket 11. As a result, even when the vehicle travels during long periods of time, foreign material is prevented from being introduced into the internal space 121 in the pocket 120. As a result, the internal space 121 in the pocket 120 remains free from contamination by the foreign material.

In the case where the coupled first structure 10 and second structure 20 need to be separated from each other, the operator brings the end of the tool 5 into contact with the flange 177 of the second opening closing-off washer 170 and pushes the tool 5 upward in such a manner that the lower end portion of the hollow column 154 is inserted into the lower end portion of the tool 5. Then, when the operator rotates the tool 5 about the axial line BL of the body 103 in the other direction, that is, in the direction opposite to the direction in which the first fastening member 100 and the second fastening member 150 are fastened to each other, the second fastening member 150 descends with respect to the first fastening member 100. As a result, the male screw thread in the first fastening member 100 and the female screw thread in the second fastening member 150 become disengaged from each other. This disengagement separates the first structure 10 and the second structure 20 from each other.

The vehicular fastening apparatus 1 described above is one assembly into which components necessary to fasten the first structure and the second structure 20 to each other are assembled. Thus, a machine and manpower for feeding the fastening member are not required when the vehicular fastening apparatus 1 is used for assembling. The use of the vehicular fastening apparatus 1 can prevent the fastening member from being lost, and can facilitate the automation of an assembling operation. As a result, the use of the vehicular fastening apparatus 1 can provide the advantage of reducing manufacturing costs and assembling productivity.

In addition, with the vehicular fastening apparatus 1 described above, it is possible that the first structure 10 and the second structure are coupled to each other. This is because the first fastening member 100 and the second fastening member 200 can be fastened to each other as long as the first fastening member 100 can be inserted into the first opening 125 in the housing 111. In other words, a slight distortion occurring in the first structure 10 or the second structure 20 may result in a relatively high tolerance between the position of the first fastening member 100 and the position of the housing 111. Even in such cases, the first fastening member 100 and the second fastening member 150 can still be repeatedly fastened to and separated from each other. Furthermore, there is no need for any additional operations of compensating for the distortion in the first structure 10 or the second structure 20.

The embodiment of the present disclosure is described only in an exemplary manner referring to the drawings. It would be apparent to a person of ordinary skill in the art to which the present disclosure pertains that various other modifications and equivalents are possible from this description. Therefore, the proper scope of the present disclosure should be defined by the following claims.

What is claimed is:

1. A vehicular fastening apparatus comprising:
   a first fastening member fixed to a first structure;
   a housing fixed to a second structure and having a first opening into which the first fastening member is inserted; and
   a second fastening member positioned inside the housing, fastened to the first fastening member inserted into the housing through the first opening, and movable in the housing in a direction that intersects an insertion direction of the first fastening member, wherein the second fastening member is moved in the direction intersecting the insertion direction when an axial line of the second fastening member is offset from an axial line of the first fastening member.

2. The vehicular fastening apparatus of claim 1, wherein the first fastening member comprises:

a body, a male screw thread being formed in an outer circumferential surface of the body, and wherein the second fastening member comprises:

a hollow column, the body being inserted into an inside hole in the hollow column, and a female screw thread, which is engaged with the male screw thread, being formed in an inner circumferential surface of the hollow column.

3. The vehicular fastening apparatus of claim 2, wherein the first fastening member further comprises:

a conical portion continuously extending from an end of the body, an outer diameter of the conical portion decreasing toward a direction away from the body.

4. The vehicular fastening apparatus of claim 2, wherein the second fastening member comprises:

a funnel continuously extending from an end of the hollow column facing the first fastening member, an inner diameter of the funnel increasing toward a direction away from the hollow column.

5. The vehicular fastening apparatus of claim 2, wherein an outer circumferential surface of the hollow column has a polygonal cross section.

6. The vehicular fastening apparatus of claim 5, wherein the housing has a second opening formed at an opposite side of the first opening, and is configured such that a tool for rotating the second fastening member is insertable into the housing through the second opening.

7. The vehicular fastening apparatus of claim 6, wherein the second opening has a greater inner diameter than the first opening.

8. The vehicular fastening apparatus of claim 6, further comprising:

a second opening closing-off washer positioned inside the housing and configured to close off the second opening.

9. The vehicular fastening apparatus of claim 8, wherein the second opening closing-off washer comprises:

a ring-shaped portion movable in the lengthwise direction of the hollow column, the hollow column passing through the ring-shaped portion; and a flange expanding outward from the ring-shaped portion.

10. The vehicular fastening apparatus of claim 9, further comprising:

a spring elastically pressing against the second opening closing-off washer in a direction in which the second opening is closed off.

11. The vehicular fastening apparatus of claim 10, further comprising:

a spring support washer positioned inside the housing, supporting the spring, and supported on the flange.

12. The vehicular fastening apparatus of claim 11, wherein, when the second fastening member rotates, the second opening closing-off washer rotates together with the second fastening member, and the spring support washer does not rotate together with the second opening closing-off washer.

13. The vehicular fastening apparatus of claim 12, wherein the housing comprises:

one or more guide rails on an inner surface thereof, and wherein the spring support washer comprises:

one or more guide grooves in an outer surface thereof, the one or more guide rails being inserted into the one or more guide grooves, respectively.

14. The vehicular fastening apparatus of claim 13, wherein an inner surface of the ring-shaped portion has a cross sectional shape that corresponds to a cross sectional shape of the outer circumferential surface of the hollow column that is inserted in the ring-shaped portion.

15. The vehicular fastening apparatus of claim 11, wherein the flange has an outer diameter greater than an inner diameter of the second opening.

* * * * *